(12) United States Patent
Jorgenson et al.

(10) Patent No.: US 12,432,794 B1
(45) Date of Patent: Sep. 30, 2025

(54) AVALANCHE RELAY LINKING SYSTEM

(71) Applicant: Rockwell Collins, Inc., Cedar Rapids, IA (US)

(72) Inventors: Mark B. Jorgenson, Kanata (CA); Maxime Lepage, Drummondville (CA); Scott A. Klassen, Kanata (CA)

(73) Assignee: Rockwell Collins, Inc., Cedar Rapids, IA (US)

( * ) Notice: Subject to any disclaimer, the term of this patent is extended or adjusted under 35 U.S.C. 154(b) by 328 days.

(21) Appl. No.: 18/104,886

(22) Filed: Feb. 2, 2023

(51) Int. Cl.
*H04W 76/10* (2018.01)
*H04L 1/08* (2006.01)
*H04W 40/22* (2009.01)

(52) U.S. Cl.
CPC .............. *H04W 76/10* (2018.02); *H04L 1/08* (2013.01); *H04W 40/22* (2013.01)

(58) Field of Classification Search
None
See application file for complete search history.

(56) References Cited

U.S. PATENT DOCUMENTS

| | | | |
|---|---|---|---|
| 4,639,937 A | 1/1987 | McRae et al. | |
| 5,930,685 A | 7/1999 | Straub | |
| 8,311,488 B2 | 11/2012 | Furman et al. | |
| 10,849,131 B2 | 11/2020 | Kannan et al. | |
| 11,190,862 B1 | 11/2021 | Jorgenson et al. | |
| 11,382,143 B1 | 7/2022 | Stevens et al. | |
| 11,411,613 B2 | 8/2022 | Jorgenson et al. | |
| 11,425,605 B1 | 8/2022 | Cheng | |
| 11,463,119 B2 | 10/2022 | Eder et al. | |
| 11,464,009 B2 | 10/2022 | Woods et al. | |
| 2019/0097911 A1* | 3/2019 | Watanabe | H04L 1/1621 |
| 2023/0300907 A1* | 9/2023 | Kalhan | H04W 72/40 370/329 |
| 2024/0267960 A1* | 8/2024 | Cheong | H04W 4/80 |

* cited by examiner

*Primary Examiner* — Robert M Morlan
(74) *Attorney, Agent, or Firm* — Suiter Swantz IP

(57) ABSTRACT

An Automatic Link Establishment (ALE) system incorporating Avalanche Relay (AR) is disclosed. The system includes a plurality of network nodes such as a calling node, one or more intermediate nodes, and a responding node. The calling node transmits a link establishment message to the responding node through one or more intermediate nodes. The message is transmitted via one or more transmitting and receiving channels. The one or more intermediate nodes relay the message to the responding node or one or more different intermediate nodes. The responding node receives the message and responds back to the calling node through the one or more intermediate nodes. The message may be transmitted via the same one or more channels used to receive the message.

25 Claims, 12 Drawing Sheets

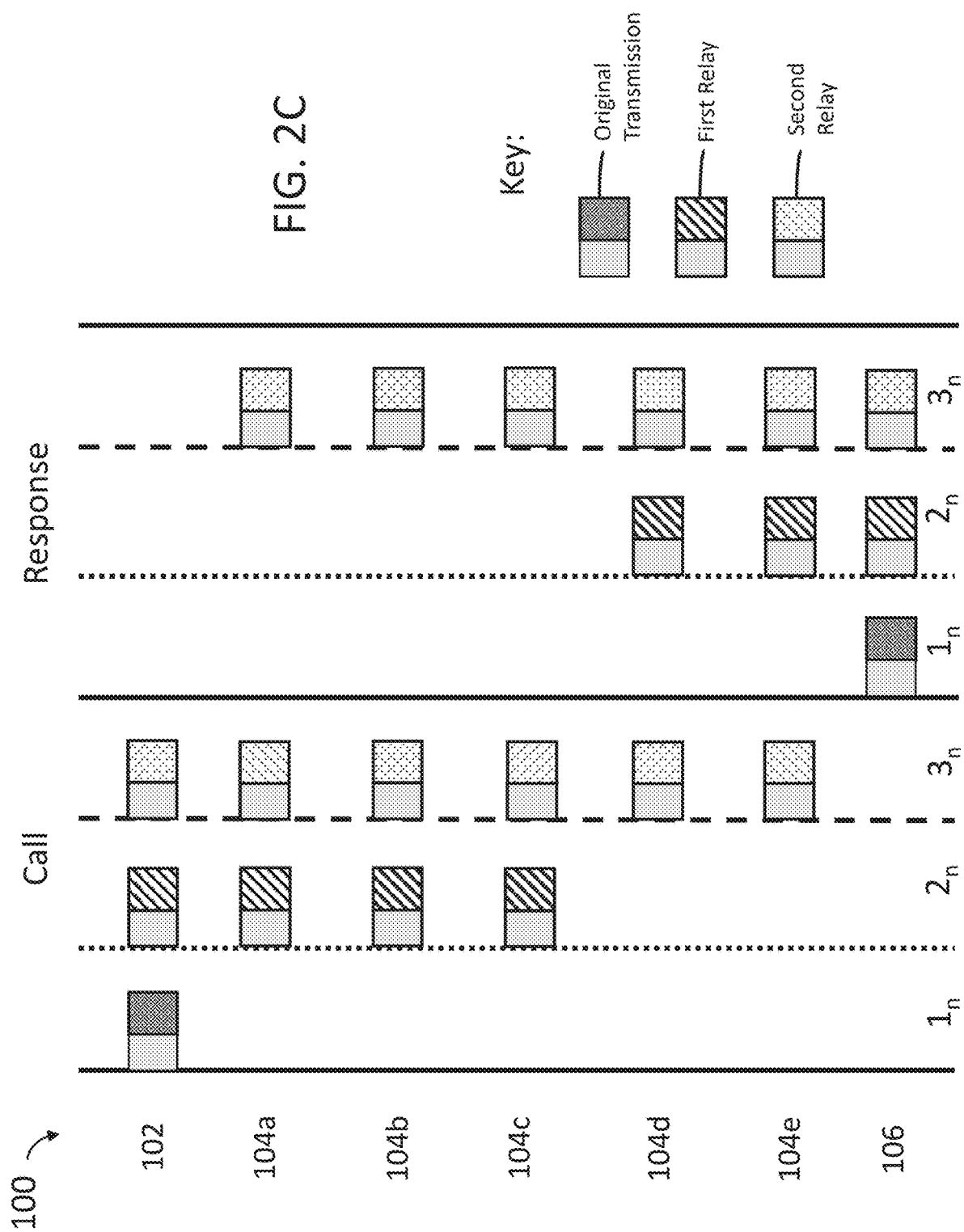

FIG. 3C

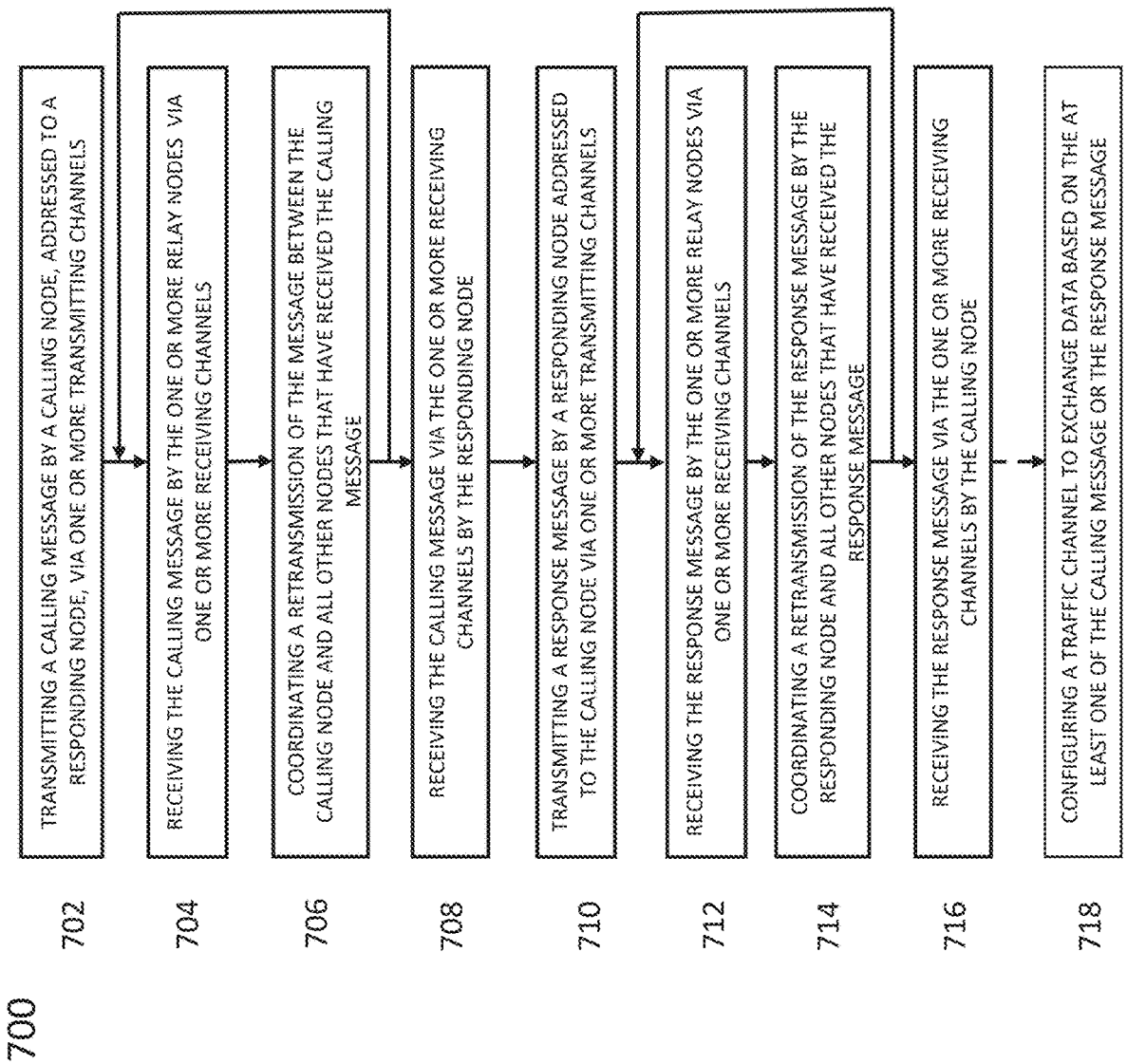

AVALANCHE RELAY LINKING SYSTEM

TECHNICAL FIELD

The present disclosure relates generally to long range radio communications and, more particularly, to an avalanche relay linking system.

BACKGROUND

Automatic link establishment (ALE) systems are routinely used to simplify the setup of radio links between HF stations relying on ionospheric propagation for communication. The ionosphere changes over time, resulting in different frequencies propagating between two distant stations at different times. ALE systems automate the process of establishing connectivity between stations by having an agreed upon list of potential frequencies or channels, and then conduct an initial exchange of data between the stations. When possible, the ALE finds a usable channel and determines the quality of the link on that channel. There are several standardized HF ALE systems. All operate by having the calling station select a channel from the agreed upon list, make a linking call, and then wait for a response from the station being called (the responder). If the called station hears the linking call, it sends a response to the caller. If the caller hears the responder, the stations are linked (though in some cases a third leg is required in the initial handshake). If the initial call attempt fails because either the responder or the caller fails to receive the transmission from the other station, the caller will try again, usually on a different channel from the agreed upon list, and repeat the process until the link is made. All ALE systems currently in use are limited to direct calls from one station to another station (or stations in cases where multiple stations are addressed) that can be directly reached by the station making the call without any relays in either the call or the response.

While ALEs are widely used at HF because of the variability of the propagation between stations or nodes in the network, the same general approach could be extended to other environments where channel impairments such as interference make initial connections challenging and it may be useful to have alternate channels to avoid channels that have been degraded.

SUMMARY

A link establishment system is disclosed, in accordance with one or more embodiments of the present disclosure. In some embodiments, the system includes a plurality of network nodes. In some embodiments, the plurality of network nodes includes a calling node configured to transmit a calling message, addressed to a responding node. In some embodiments, the plurality of network nodes include a responding node configured to receive the calling message and transmit a response message, addressed to the calling node. In some embodiments, the plurality of network nodes include one or more intermediate nodes configured to receive at least one of the calling message or the response message. In some embodiments, the plurality of network nodes includes at least one transducer. In other embodiments, the plurality of network nodes includes one or more controllers communicatively coupled to the at least one transducer, the one or more controllers including one or more processors configured to execute a set of program instructions stored in a memory. In some embodiments, the one or more processors may include any processors used in the art including, but not limited to, field programmable gate arrays (FPGA), and application-specific integrated circuits (ASIC). In some embodiments, the set of program instructions may cause the one or more processors to determine one or more receiving channels and one or more transmitting channels from a list of one or more accessible channels. In other embodiments, the set of program instructions may cause the one or more processors to receive the message via the one or more receiving channels. In some embodiments, the set of program instructions may cause the one or more processors to retransmit at least one of a calling message or a response message a configurable number of times via the one or more transmitting channels. In some embodiments, each node of the plurality of network nodes in possession of the calling message or response message is configured to retransmit the calling message or response message in coordination with the other nodes in possession of the calling message or response message a configurable number of times.

A link establishment system is disclosed, in accordance with one or more embodiments of the present disclosure. In some embodiments, the system includes a plurality of network nodes. In some embodiments, the plurality of network nodes include a calling node configured to transmit a link establishment message, addressed to a group of at least one responding node. In some embodiments, the plurality of network nodes include at least one responding node from the group of at least one responding node configured to receive the link establishment message from at least one of the calling node, one or more intermediate nodes, or at least one different responding node from the group of at least one responding node. In some embodiments, each node of the plurality of network nodes includes at least one transducer when RF communication is used, or more generally, some other form of transducer for other bearer mechanisms such as acoustic communications. In other embodiments, each node of the plurality of network nodes includes one or more controllers communicatively coupled to the at least one transducer, the one or more controllers including one or more processors configured to execute a set of program instructions stored in a memory. In some embodiments, the set of program instructions may cause the one or more processors to determine one or more receiving channels and one or more transmitting channels from a list of one or more accessible channels. In other embodiments, the set of program instructions may cause the one or more processors to receive the link establishment message via the one or more receiving channels. In some embodiments, the set of program instructions may cause the one or more processors to retransmit the link establishment message a configurable number of times via the one or more transmitting channels. In some embodiments, each node of the plurality of network nodes in possession of the link establishment message is configured to retransmit the link establishment message or response message in coordination with the other nodes in possession of the link establishment message a configurable number of times.

A link establishment method is disclosed, in accordance with one or more embodiments of the present disclosure. In some embodiments, the method may include, but is not limited to, transmitting a calling message by a calling node, addressed to a responding node, via one or more transmitting channels. In some embodiments, the method may include, but is not limited to, receiving the calling message by one or more intermediate nodes via one or more receiving channels. In some embodiments, the method may include, but is not limited to, coordinating a retransmission of the calling message between the calling node and all other nodes that have received the calling message. In some embodiments, the method may include, but is not limited to, receiving the link establishment message by the responding node via the one or more receiving channels. In some embodiments, the method may include, but is not limited to, transmitting a response message by the responding node, addressed to the calling node, via one or more transmitting channels. In some embodiments, the method may include, but is not limited to, receiving the response message by the one or more intermediate nodes via one or more receiving channels. In some embodiments, the method may include, but is not limited to, coordinating a retransmission of the response message between the responding node and all other nodes that have received the response message. In some embodiments, the method may include, but is not limited to, receiving the response message by the calling node via the one or more receiving channels. In some embodiments, the method may include, but is not limited to, configuring a traffic channel to exchange data based on at least one of the calling message or the response message.

It is to be understood that both the foregoing general description and the following detailed description are exemplary and explanatory only and are not necessarily restrictive of the invention as claimed. The accompanying drawings, which are incorporated in and constitute a part of the specification, illustrative embodiments of the invention and together with the general description, serve to explain the principles of the invention.

BRIEF DESCRIPTION OF DRAWINGS

The numerous advantages of the disclosure may be better understood by those skilled in the art by reference to the accompanying figures in which:

FIG. 2C is a diagrammatic illustration of a slotted link establishment system, where the call subslots map to FIG. 2A and the response subslots map to FIG. 2B, in accordance with one or more embodiments of the present disclosure;

FIG. 3C is a diagrammatic illustration of a slotted link establishment system where the call subslots map to FIG. 3A and the response subslots map to FIG. 3B, in accordance with one or more embodiments of the present disclosure;

FIG. 7 is a flow diagram illustrating a method for link establishment, in accordance with one or more embodiments of the present disclosure.

DETAILED DESCRIPTION

Figure 1A:
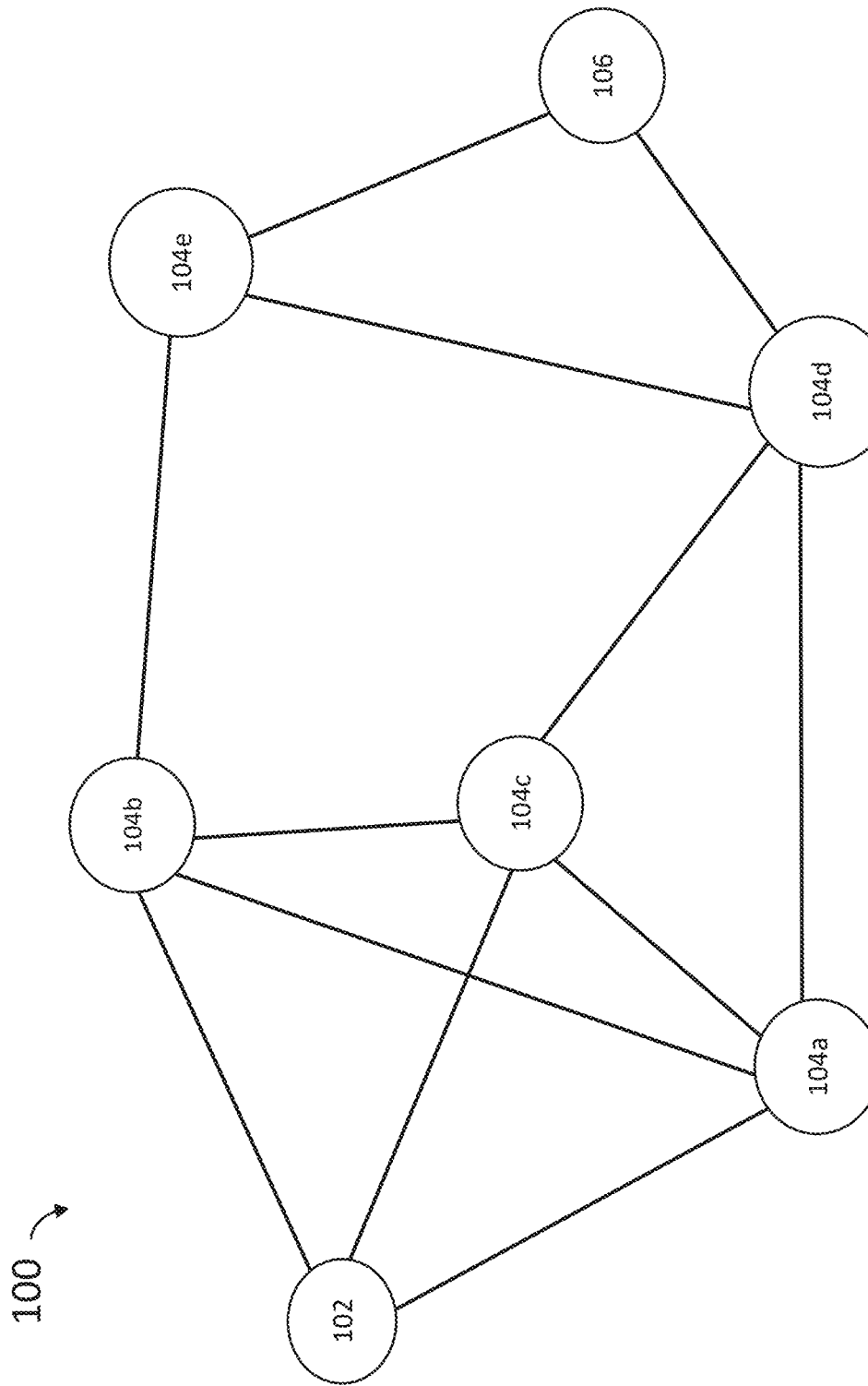
FIGS. 1A-1B are diagrammatic illustrations of exemplary topological connections between nodes used to illustrate the operation of a link establishment system, in accordance with one or more embodiments of the present disclosure.

Reference will now be made in detail to the subject matter disclosed, which is illustrated in the accompanying drawings. The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

Broadly, embodiments of the inventive concepts disclosed herein are directed to an Avalanche Relay (AR) link establishment system. U.S. Pat. No. 11,464,009 entitled "Relays in Structured Ad Hoc Networks", which was filed on Mar. 5, 2020 and issued on Oct. 4, 2022, is hereby incorporated by reference. Additionally, low latency voice and situational awareness services where all nodes hear a transmission and make a coordinated retransmission of the same information in a later, synchronized transmission may be more fully understood with reference to U.S. Pat. No. 11,190,862 entitled "ENHANCED HIGH FREQUENCY AVALANCHE RELAY PROTOCOL", which was filed on Nov. 16, 2020 and issued on Nov. 30, 2021, which is also hereby incorporated by reference.

Automatic Link Establishment (ALE) Systems allow efficient setup of HF links by finding propagating channels between nodes in a network when they wish to communicate. Avalanche Relay (AR) can be used to provide more robust connections in networks with multiple nodes and to avoid the overhead and latency associated with networking techniques that require state information about network topologies. Combining AR with HF ALE helps to enhance the reliability of link establishment and enables multi-hop topologies. Additionally, the same techniques may be utilized to establish communication links with relays for media other than HF radio.

AR can be incorporated into synchronous ALE systems to improve resilience and enable multi-hop connectivity by adjusting the timing of the call and response with existing ALE systems to account for the additional subslots needed for the AR. Improved performance can be obtained by modifying the ALE waveform structures to minimize the additional delay from incorporating AR. Very short transmissions can be used to capture the scan of any receivers that are able to participate in the AR prior to sending the ALE call. Other aspects of the invention include (1) optimizing the number of subslots employed in a subsequent AR traffic exchange and (2) extending the approach to take advantage of multiple channels when staring receivers are used.

Existing ALE systems require calling and responding nodes to have a direct link. Avalanche Relay (AR) allows this to be extended to encompass cases where one or more relays are required between the calling and responding node. AR can provide a large measure of diversity in the signal path between nodes, making the mechanism considerably more robust than one which is dependent on a single path. The extension of avalanche relay and link establishment to using multiple channels provides protection against disruption as well as extending the link setup to topologies requiring one or more relays.

In general, FIG. 1 is a diagrammatic illustration of topological connections between nodes that will be used to illustrate the operation of a link establishment system, in accordance with one or more embodiments of the present disclosure.

Figure 2A:
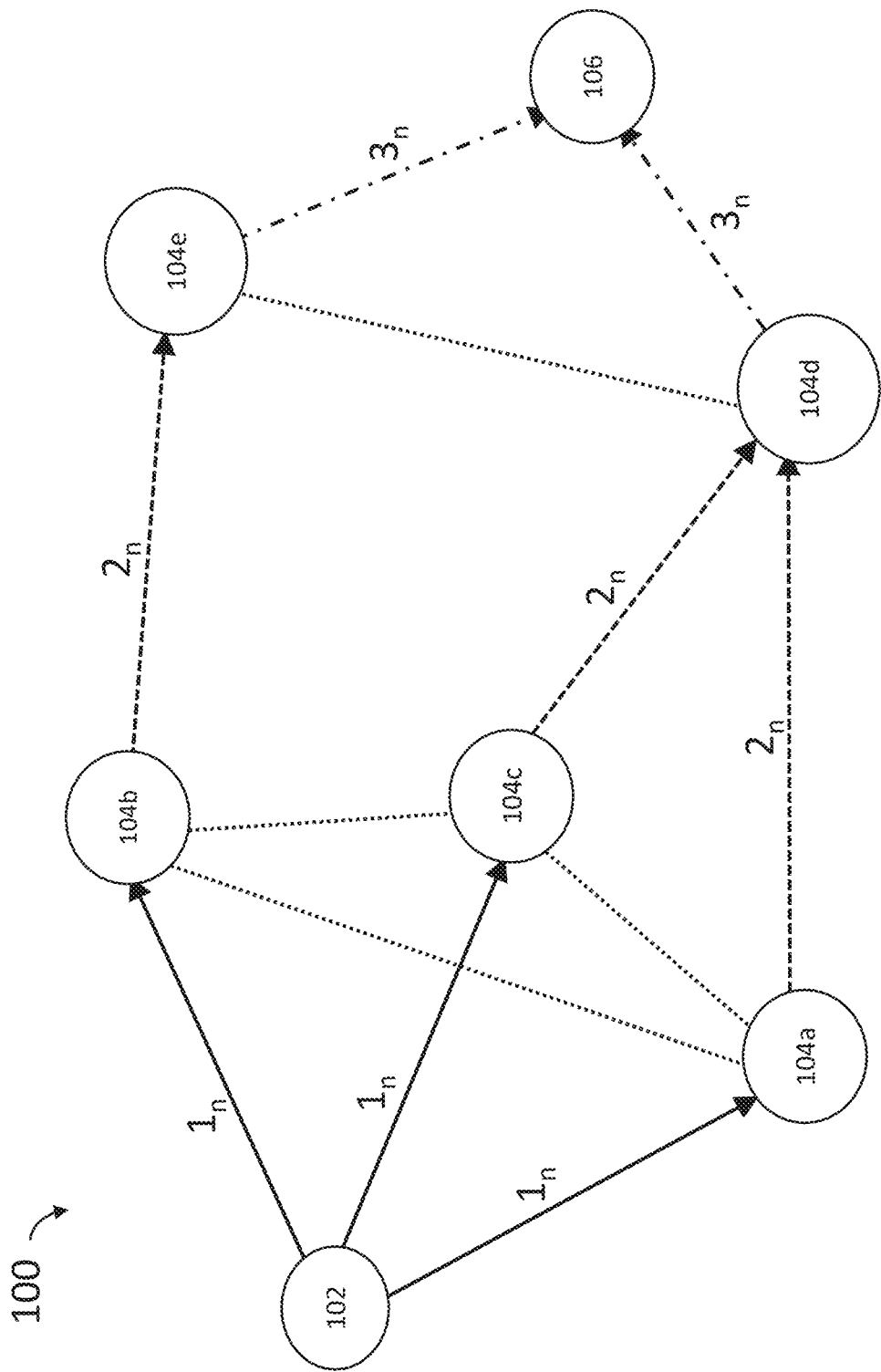
FIGS. 2A-2B are diagrammatic illustrations of the operation of a link establishment system, operating in the topology illustrated in FIG. 1A, with node 102 as the calling node and node 106 as the responding node, requiring two relays, in accordance with one or more embodiments of the present disclosure.
Figure 2B:
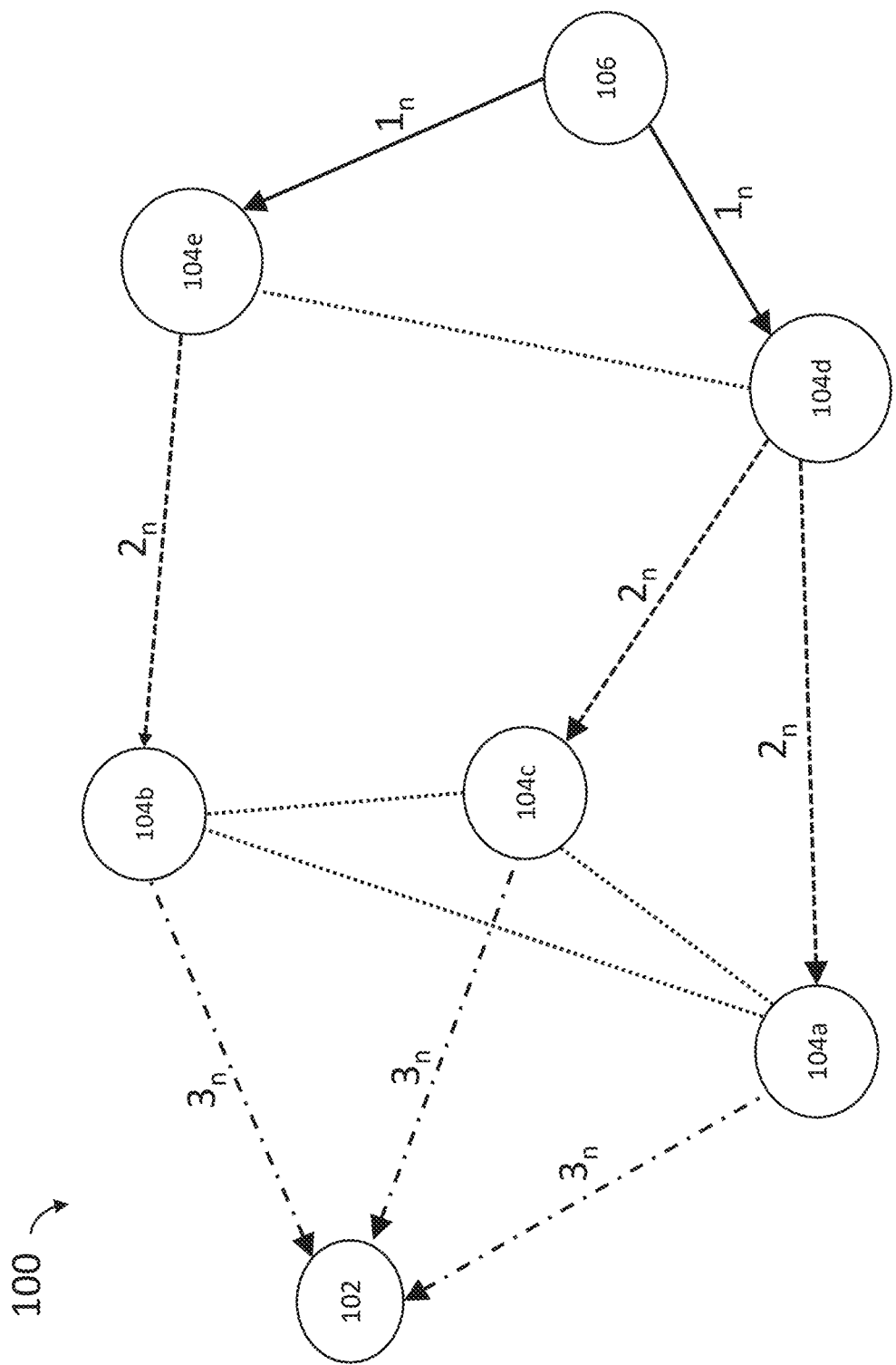

In general, FIGS. 2A-2C illustrate a link establishment system 100, operating in the illustrative topology of FIG. 1A, in accordance with one or more embodiments of the present disclosure. In some embodiments, the system 100 may include a plurality of network nodes. For example, the plurality of network nodes may include a calling node 102. By way of another example, the plurality of network nodes may include one or more intermediate nodes 104 (e.g., 104*a*, 104*b*, 104*c*, 104*d*, or 104*e*). By way of another example, the plurality of network nodes may include a responding node 106.

Figure 6:
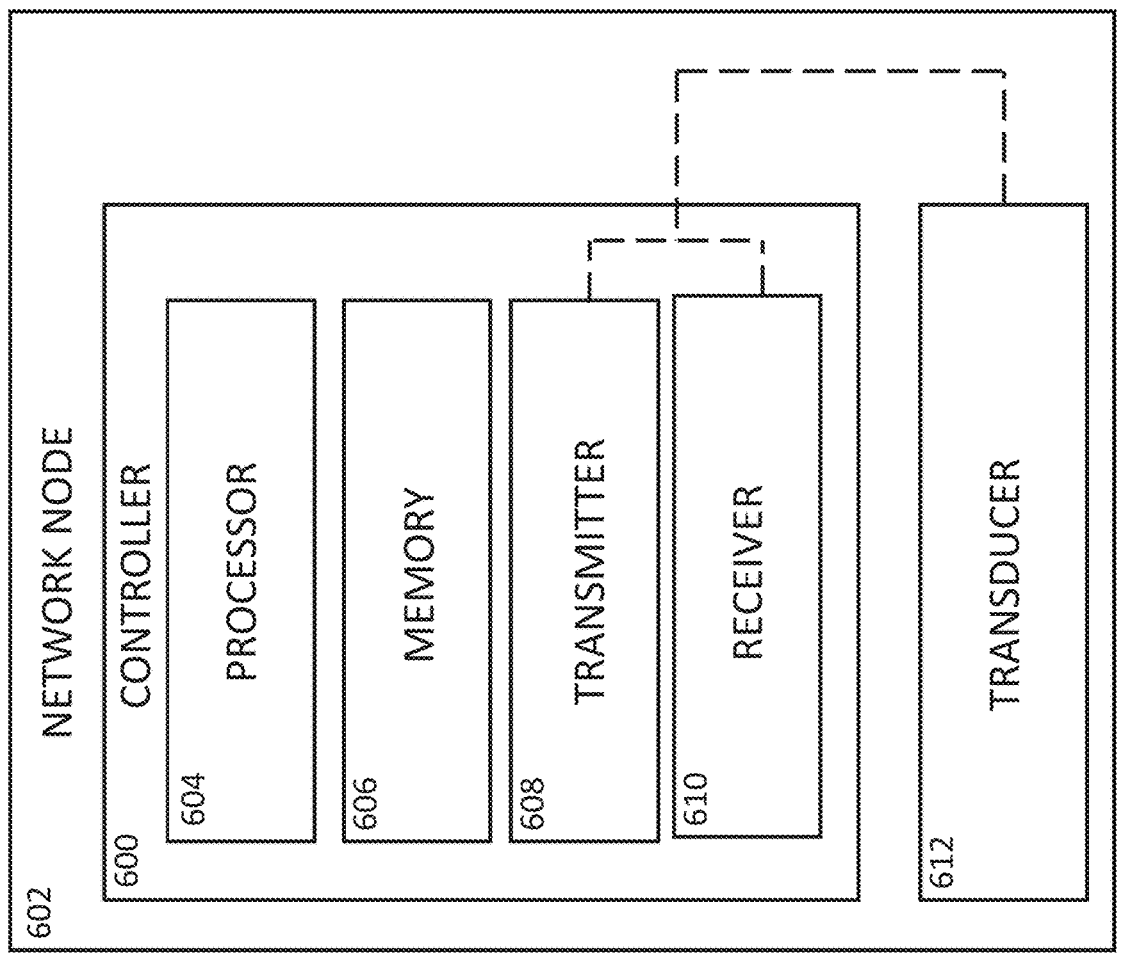
FIG. 6 is a block diagram illustrating an exemplary node of a link establishment system, in accordance with one or more embodiments of the present disclosure.

In some embodiments, the plurality of network nodes may include a controller 600, as shown in FIG. 6. The controller 600 provides processing functionality for the network node 602 and may include one or more processors 604. The one or more processors 604 may include any processors 604 used in the art including, but not limited to, field programmable gate arrays (FPGA), and application-specific integrated circuits (ASIC). The controller 600 may utilize the one or more processors 604 to receive and decode incoming transmissions and recode and retransmit the relayed transmissions. In some embodiments, the controller 600 may include a transducer 612. For example, the transducer 612 may function as an antenna configured to convert between electrical signals and electromagnetic waves. By way of another example, the transducer may include one or more transmitters 608 and/or one or more receivers 610. By way of another example, the one or more receivers may include one or more scanning receivers or staring receivers. The controller 600 may also include resident or external memory 606 for storing data, executable code, and other information accessed or generated by the network node 602. The controller 600 may execute one or more software programs embodied in a non-transitory computer readable medium (e.g., a memory 606) that implements techniques described herein. The controller 600 is not limited by the materials from which it is formed or the processing mechanisms employed therein.

In some embodiments, the system 100 may be configured to incorporate Avalanche Relay into a new link establishment system or to incorporate Avalanche Relay (AR) into an existing link establishment system. The operation of the system for a topology that requires two relays is illustrated in FIGS. 2A-2B. In some embodiments, the system 100 may include two or more subslots. For example, the two or more subslots may be configured in advance, as with the 3 subslots shown in the example in FIG. 2C. By way of another example, the calling node 102 may be configured to transmit a link establishment message addressed to a responding node 106. By way of another example, the one or more intermediate nodes 104, having received the link establishment message may be configured to retransmit the link establishment message. It is noted that this process may be configured to repeat as many times as necessary in order to establish the link between the calling node 102 and the responding node 106. By way of another example, the responding node 106 may receive the link establishment message from at least one of the calling node and/or the one or more intermediate nodes 104. These steps may be illustrated in at least one of FIG. 2A, FIG. 2C (under "Call" on the left-hand side), or FIG. 7 (i.e., steps 702-708).

In some embodiments, the responding node 106 may be configured to respond back to the calling node 102 upon receipt of the link establishment message. For example, the responding node 106 may be configured to transmit a link establishment response message addressed to a calling node 102. By way of another example, the one or more intermediate nodes 104, having received the link establishment response message may be configured to retransmit the link establishment response message. It is noted that this process may be configured to repeat as many times as necessary in order to close the link between the responding node 106 and the calling node 102. By way of another example, the calling node 102 may be configured to receive the link establishment response message from at least one of the responding node 106 or the one or more intermediate nodes 104. These steps are illustrated in at least one of FIG. 2B, FIG. 2C (under "Response" on the right-hand side), or FIG. 7 (i.e., steps 710-716).

For example, the responding node 106 may transmit a response back to the calling node 102 via the same one or more channels that were used to receive the message. If no response is heard, the calling node 102 may proceed to the next channel in a scan list of accessible channels and try again. It is further noted that the one or more channels may include, but are not limited to, a distinct channel (e.g., acoustic or RF frequency), a particular encoding as employed in code division multiple access (CDMA) systems, a specific hop sequence, or the like.

In some embodiments, AR may be incorporated into existing synchronous ALE systems by adjusting the timing of the link establishment message and response to account for the additional subslots needed for the AR. For example, if existing ALE structures are used, a dwell time for 3G Automatic Link Establishment (ALE) would preferably be multiplied by the number of subslots required in order to fit the entire link establishment message within the dwell. By way of another example, in 4G ALE, where a link establishment message may extend past the dwell, the length of the dwell may need to be increased by a greater percentage in order to account for the existing dwell plus one less than the number of complete subslots, which may cause the linking time to also be extended. In other embodiments, very short transmissions may be used to capture the scan of any receivers that are able to participate in the Avalanche Relay (AR) prior to sending the link establishment message.

In some embodiments, AR may be used with traditional asynchronous calls. It is noted that using AR with traditional asynchronous calls may not be desirable due to the long link establishment messages required at each step of the system 100. However, shorter calls may be used on the responder's leg if the one or more intermediate nodes 104 stay on the channel to wait for a follow-on response.

In some embodiments, AR may be used with a synchronous scanning system. For example, the timing of the dwell may be adjusted to allow additional time needed for the link establishment message to reach the responding node 106 and the response to reach the calling node 102. It is noted that this may require much longer dwells because the system 100 may prevent the one or more receivers from moving on to their next channel until they have had an opportunity to receive a predetermined quantity of relays.

In an alternative embodiment, the system 100 may include new waveforms and protocol to fit in shorter subslots in order to reduce the additional time required for an initial link establishment message exchange, followed by a second handshake with the plurality of network nodes that have been captured by the initial link establishment message. It is noted herein that the initial link establishment message may be configured to communicate a quantity of relay hops. For example, the initial link establishment message may include a counting device configured to communicate to the one or more receivers which relay hop was first received. By way of another example, the responding node 106 may be configured to communicate to the one or more receivers a quantity of relay hops required for the initial link establishment message to reach the responding node 106 in its reply to the calling node 102. It is noted herein that the counting device may be used in the responding node's 106 avalanche relay transmission back to the calling node 102, which may allow for optimization of the number of relays in either direction (e.g., a same quantity of relays or a different quantity of relays). It is noted herein that this optimization may also be useful for channels that don't have to worry about whether a frequency is propagating (e.g., surface wave HF or line of sight on other frequencies).

In some embodiments, the responding node 106 may be aware of a direct link established with the calling node 102, in which case the responding node 106 may be configured to preempt some of the steps in sending the response message to the caller mentioned above. For example, the system 100 may include a low-power transmitter in a calling node 102 configured to communicate with a High Frequency Global Communications System (HFGCS) site as the responding node 106, where relays by intermediate nodes 104 maybe be required to deliver the calling message and may not be required to deliver the response message as a result of the HFGCS site having a high-power link back to the calling node 102.

Figure 1B:
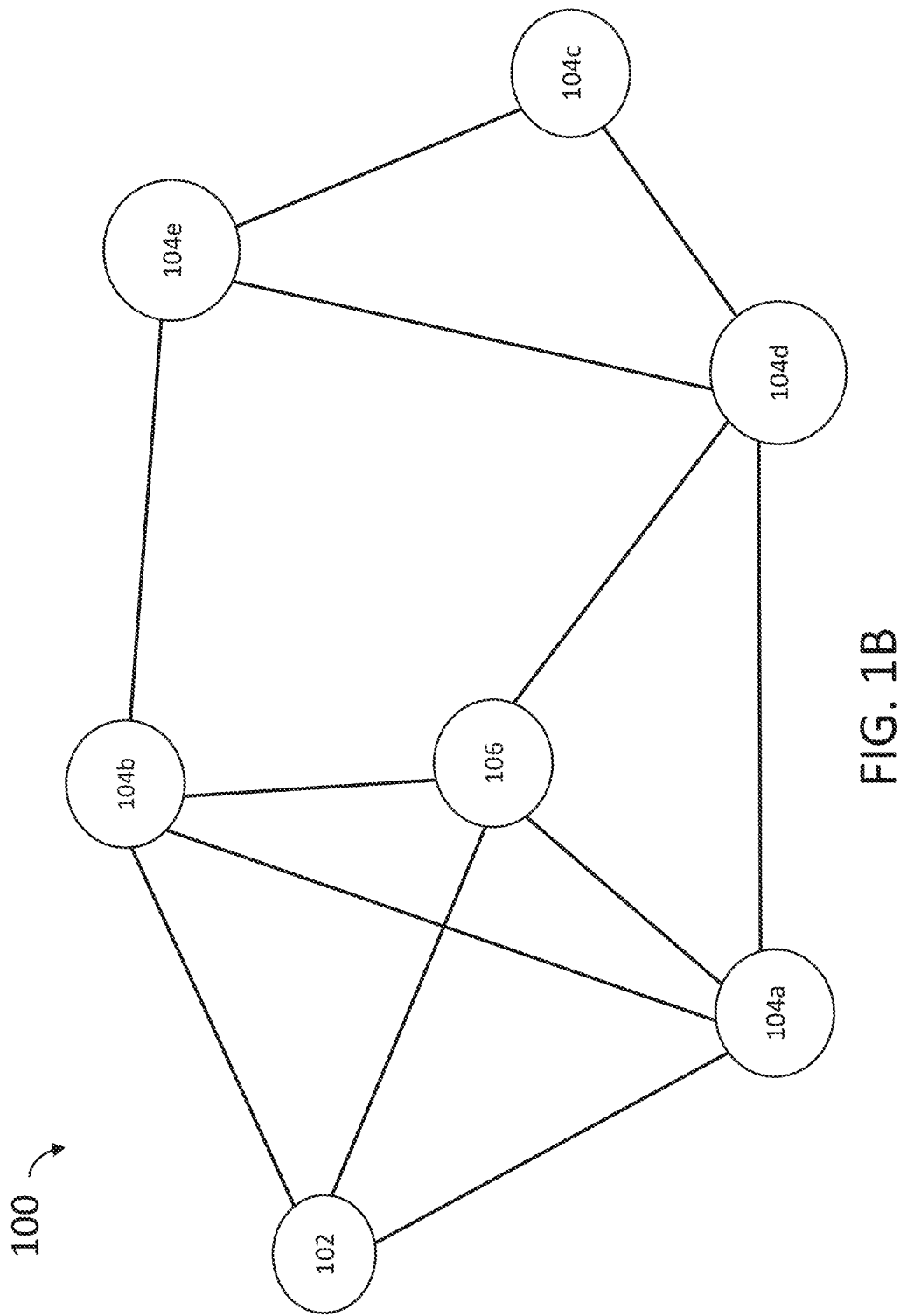
Figure 3A:
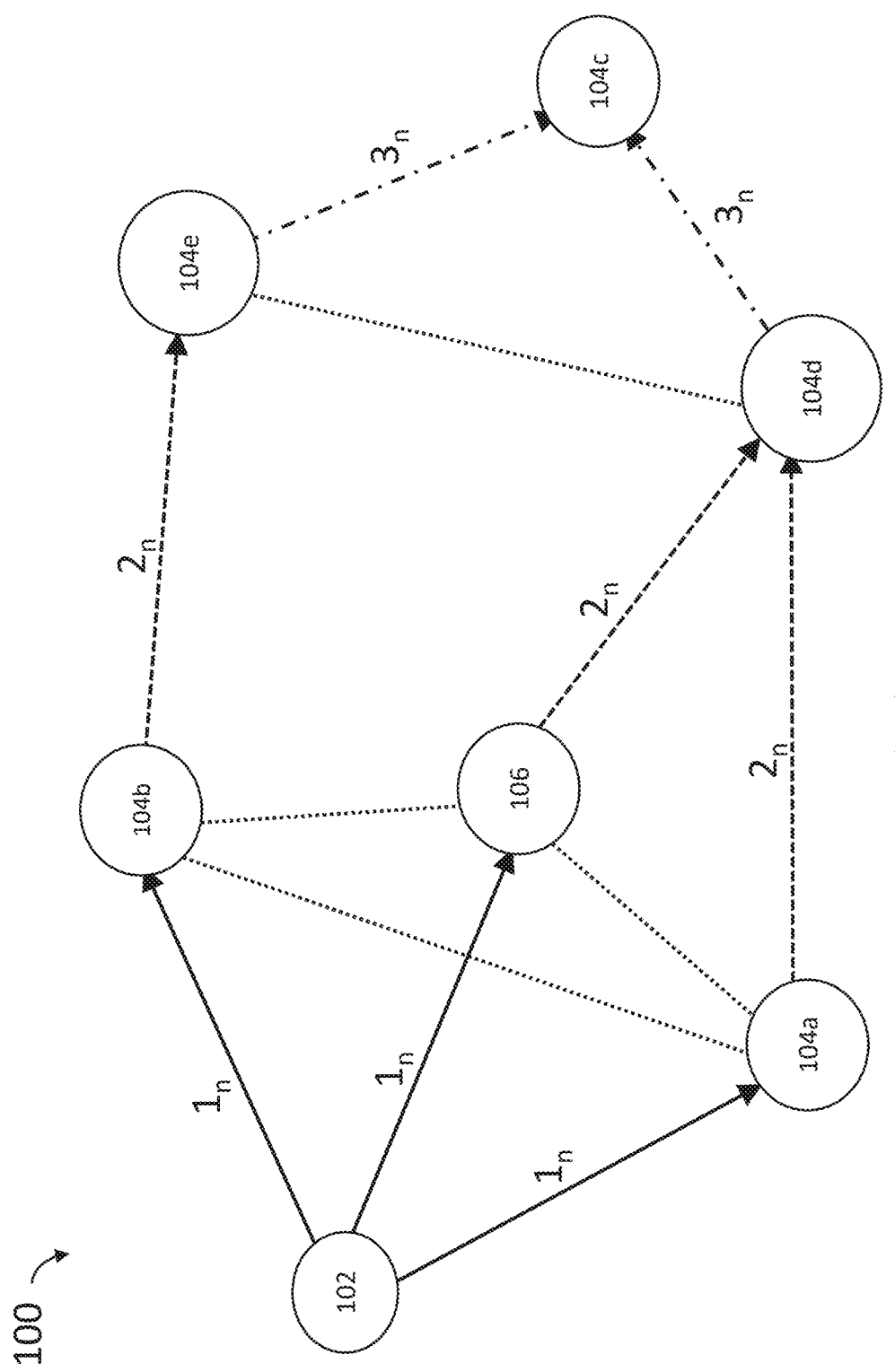
FIGS. 3A-3B are diagrammatic illustrations of the operation of a link establishment system, operating in the topology illustrated in FIG. 1B, with node 102 as the calling node and node 106 as the responding node, requiring no relays, in accordance with one or more embodiments of the present disclosure.
Figure 3B:
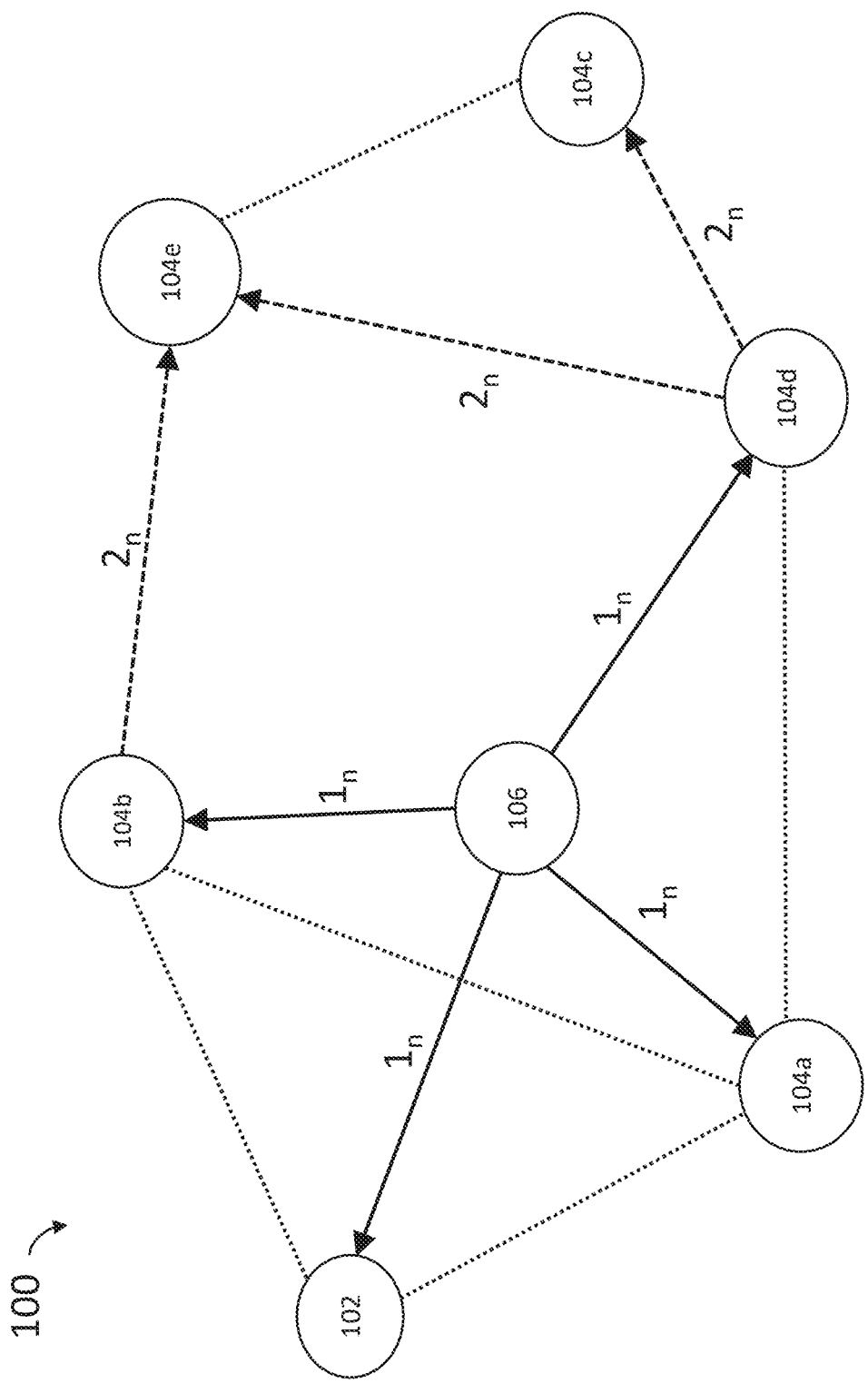
Figure 3C:
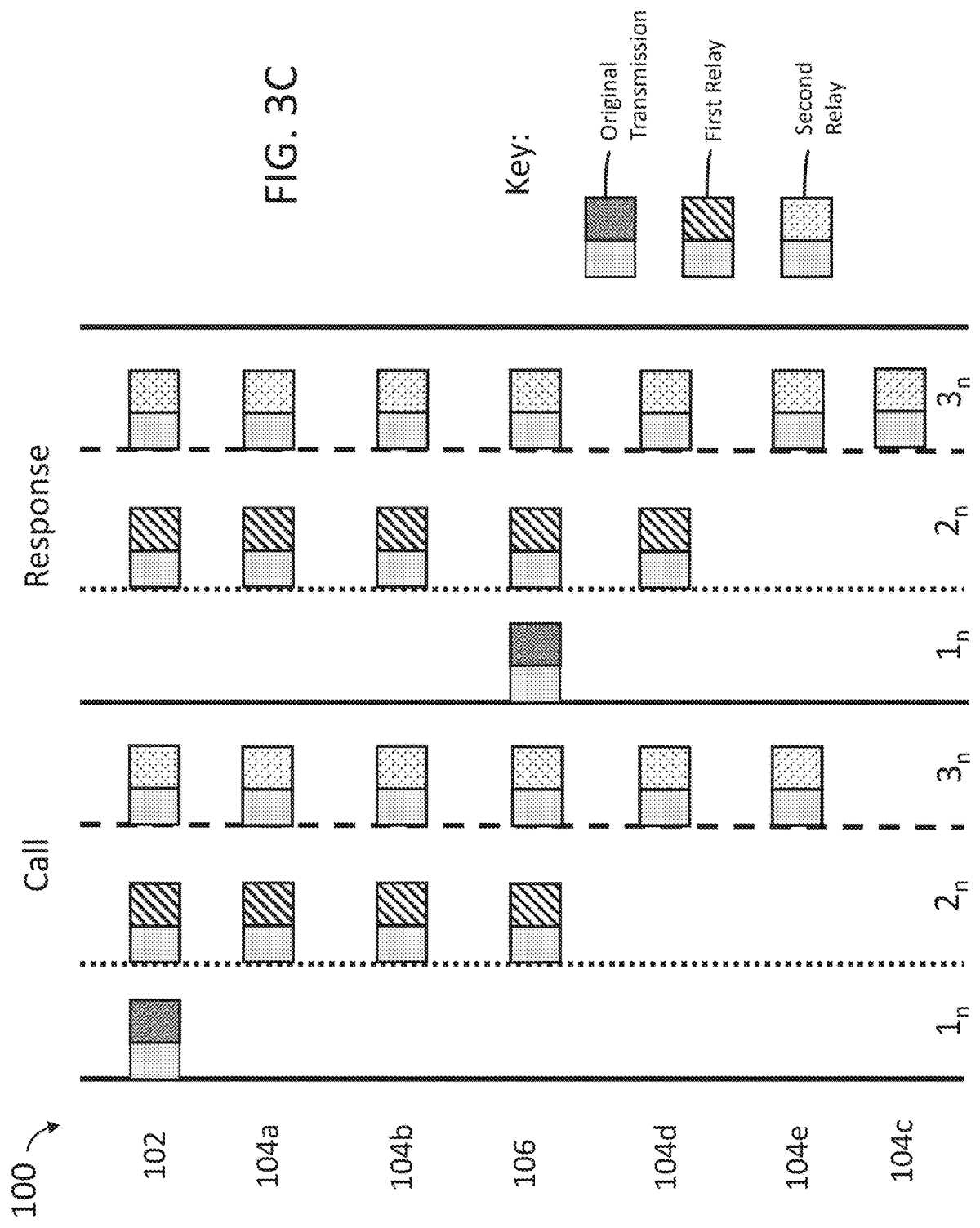

In general, FIGS. 3A-3B illustrate a linking system 100 operating in the illustrative topology of FIG. 1B, with no relay required, in accordance with one or more embodiments of the present disclosure. In many cases, the links between neighbors are not perfect and may experience losses due to poor signal to noise ratio in general or due to fading effects. Under circumstances where connectivity between nodes is subject to degradation, the system in FIGS. 3A-3B can benefit from the diversity provided by alternate paths between the caller to the responder. It is notable that the pattern of transmissions in response to the transmission of the calling message in FIG. 2A and FIG. 3A, as well as the timings of the transmissions by intermediate nodes in response to the initial calling message illustrated in FIG. 2C and FIG. 3C are identical. This reflects the nature of the system where the topology and origin node of the call define the pattern of transmissions within the subsequent subslots, so even though the intended recipient has received the calling message after the first transmission in FIG. 3A and FIG. 3C, the automatic relay of the message to the remainder of the nodes continues throughout the remaining subslots. As illustrated in FIG. 2B and FIG. 3B, the pattern of transmissions and their timings may differ when the responding node is in a different configuration.

In some embodiments, the system 100 may include a counting device. For example, the counting device may determine that one hop propagation exists between the calling node 102 and the responding node 106. As seen in FIGS. 3A-3B, the calling node 102 and the responding node 106 may be configured to subsequently exchange traffic directly, without requiring relays, upon determination of a direct link. It is noted herein that although the system 100 in FIGS. 3A-3B may establish a direct link between the calling node 102 and the responding node 106, the system 100 may also utilize multiple subslots in order to enhance the reliability of the link.

In some embodiments, the responding node 106 may be configured to transmit a response to the calling node 102 upon receipt of the link establishment message. For example, the responding node 106 may be configured to respond directly to the calling node 102, or the responding node 106 may be configured to respond to the calling node 102 through one or more intermediate nodes 104.

In some embodiments, very short transmissions may be used to test connectivity. For example, the very short transmissions may be used prior to the transmission of the initial link establishment message. In some embodiments, the system 100 may include channel diversity. However, it is noted herein that channel diversity is preferably incorporated in a pre-planned fashion when staring receivers are not used.

Figure 4:
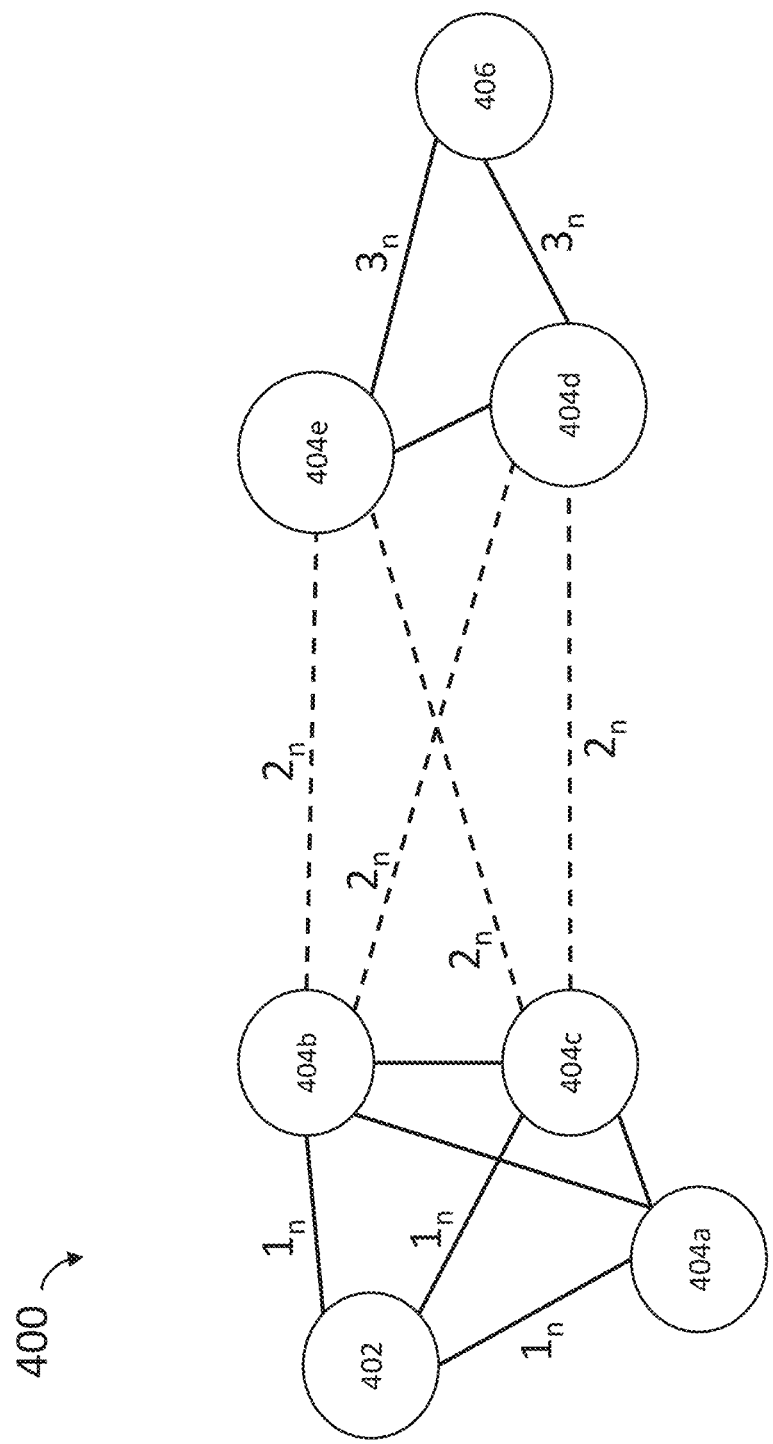
FIG. 4 is a diagrammatic illustration of a link establishment system having different channel types such as: short and long-range propagation; or acoustic and RF propagation, in accordance with one or more embodiments of the present disclosure.

In general, FIG. 4 illustrates a linking system 400 having mixed channel types, with the different channel types identified in the figure by solid and dashed lines. As an example, the solid lines may represent short range propagation while the dashed lines may represent long-range propagation. As another example, the solid lines may represent acoustic signal channels (or other wave based medium or the like) while the dashed lines may represent RF channels, in accordance with one or more embodiments of the present disclosure. In some embodiments, the system 400 may include a plurality of network nodes. For example, the plurality of network nodes may include at least one of a calling node 402, one or more intermediate nodes 404 (e.g., 404a, 404b, 404c, 404d, or 404e), or a responding node 406. By way of another example, the calling node 402 may transmit a link establishment message to the responding node 406 through the one or more intermediate nodes 404. Further, the one or more intermediate nodes 404 may be configured to relay the link establishment message to at least one of the responding node 406 or one or more different intermediate nodes 404. The one or more different intermediate nodes 404 may be configured to relay the link establishment message to the responding node 406.

In some embodiments, the system 400 of the present disclosure may include one or more intermediate nodes 404 of the plurality of network nodes configured to receive a link establishment message on one channel and relay the link establishment message on a different channel. For example, one or more subslots may include dedicated reach-back nodes, where the dedicated reach back nodes use specific channels (e.g., frequencies selected specifically for long-range propagation).

In some embodiments, as shown in FIG. 4, any reception of the link establishment message, through one channel (e.g., dashed line or solid line), by the one or more intermediate nodes 404b, 404c, 404d, or 404e, may be relayed through a different channel (e.g., dashed line or solid line). By way of another example, if any of the network nodes 404b, 404c, 404d, or 404e receive a link establishment message on a solid line channel, then it will be relayed on a dashed line channel. By way of another example, if any of the intermediate nodes 404b, 404c, 404d, or 404e receive a link establishment message on a dashed line channel, then it may be relayed on a solid line channel.

In some embodiments, the system 400 may be completed asynchronously without the need for a long link establishment message. For example, when staring receivers are used an initial link establishment message may come at any time, and the one or more intermediate nodes 404 may be timed relative to the reception of the initial link establishment message, or the first relay message heard. In other embodiments where scanning receivers are used, an initial call by the calling station will be needed to capture all the available nodes' scanning receivers on a particular channel. After that has happened the remainder of the link establishment procedure can proceed in the same manner as when staring receivers are employed.

In some embodiments, the one or more network nodes of the plurality of network nodes may include one or more staring receivers. For example, the one or more staring receivers may be configured to listen simultaneously on one or more channels. The one or more staring receivers may be configured to allow for channel diversity in the Avalanche Relay (AR). It is noted herein that spreading the transmissions from the one or more intermediate nodes 404 out across one or more different channels may be beneficial for at least improving diversity and/or decreasing the chance of a disruption on one channel resulting in message loss.

In some embodiments, each node of the plurality of network nodes hearing an initial transmission may be configured to make independent decisions on whether to relay the message on the same channel or on a different channel in a scan list. For example, one or more nodes of the plurality of network nodes transmitting on the same channel may need identical and synchronized transmissions with the receiver, so that they are received simultaneously and within an uncertainty window allowed by a delay spread capability of the receiver.

Figure 5:
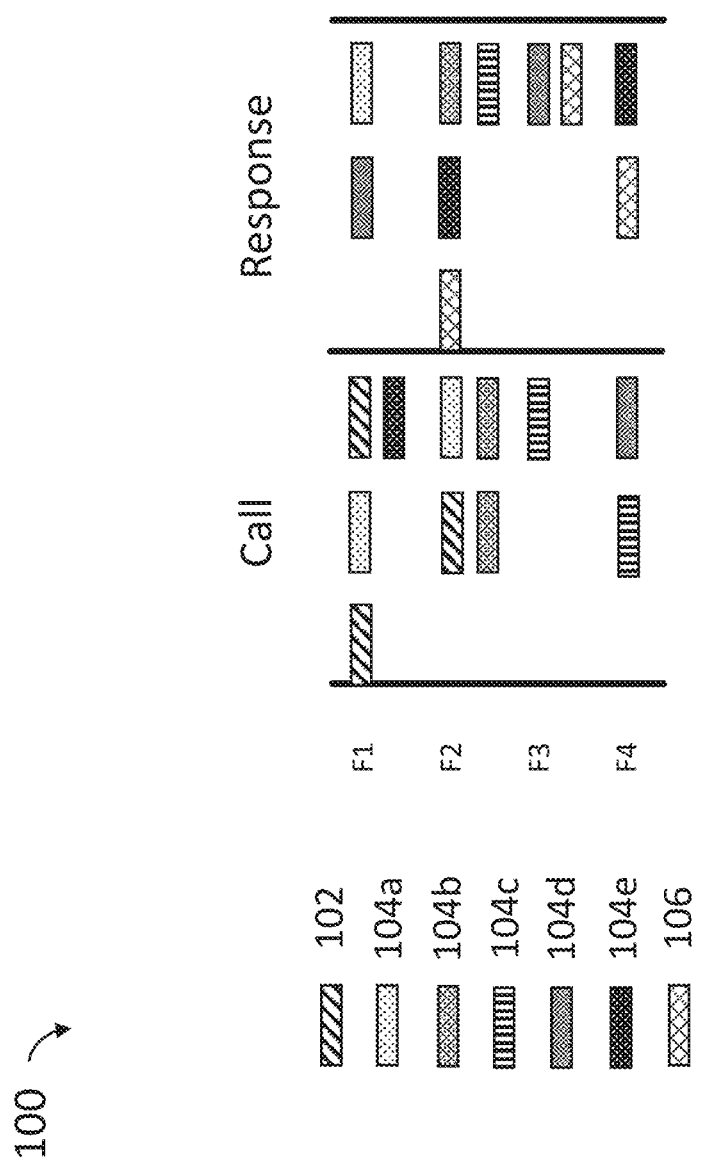
FIG. 5 is a diagrammatic illustration of a link establishment system having channel selection selectable or randomized on an individual node basis, in accordance with one or more embodiments of the present disclosure.

In general, FIG. 5 illustrates the operation of a linking system 100, operating in the topology of FIG. 1A and employing calling and responding nodes as shown in FIGS. 2A-2B, having randomized channel selection, in accordance with one or more embodiments of the present disclosure. In some embodiments, the plurality of network nodes may be configured to randomly select one or more communication channels. For example, the number of relay hops may vary depending on the one or more communication channels selected. In some embodiments, the plurality of network nodes may be configured to retain the same channel selections for a specific communication channel identified as a successful link (e.g., only the initial channel selection would be randomized.) For example, the system 100 may include multiple coordinated transmitting signals appearing on the same communication channel. By way of another example, the multiple transmitting signals appearing on the same channel may be configured to combine. It is noted herein that although FIG. 5 depicts four communication channels, the system 100 is not limited to only four communication channels.

In general, FIG. 6 illustrates an exemplary node of the link establishment system 100, in accordance with one or more embodiments of the present disclosure. In some embodiments, the network node 602 may be representative of the plurality of network nodes seen in FIGS. 1-5 including, but not limited to, a calling node (e.g., 102 or 402); one or more intermediate nodes (e.g., 104 or 404); a responding node (e.g., 106 or 406); or the like. For example, the network node 602 may be adapted to function such as, but not limited to, a transceiver, a split-site, or any other type of node known in the art configured to receive a message while transmitting. By way of another example, the network node 602 may include a controller 600. The controller 600 provides processing functionality for the network node 602 and may include one or more processors 604. The one or more processors 604 may include any processors 604 used in the art including, but not limited to, field programmable gate arrays (FPGA), and application-specific integrated circuits (ASIC). The controller 600 may utilize the one or more processors 604 to receive and decode incoming transmissions and recode and retransmit the relayed transmissions. The controller 600 may also include resident or external memory 606 for storing data, executable code, and other information accessed or generated by the network node 602. The controller 600 may execute one or more software programs embodied in a non-transitory computer readable medium (e.g., a memory 606) that implements techniques described herein. The controller 600 is not limited by the materials from which it is formed or the processing mechanisms employed therein.

The memory 606 may be an example of a tangible, computer-readable storage medium that provides storage functionality to store various data and/or program code associated with operation of the network node 602 and/or controller 600, such as software programs and/or code segments, or other data to instruct the controller 600, and possibly other components of the network node 602. The memory 606 may store data, such as a set of program instructions for operating the network node 602 and/or incoming data from the initial link establishment call or the algorithmically related link establishment call. It should be noted that while a single memory 606 is described, a wide variety of types and combinations of memory 606 (e.g., tangible, non-transitory memory) may be employed. The memory 606 may be integral with the controller 600, may comprise stand-alone memory, or may be a combination of both. Some examples of the memory 606 may include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

In some embodiments, the one or more processors 604 may be configured to identify one or more communication channels that were used to successfully communicate the initial link establishment call. For example, the memory 606 may record the one or more successful communication channels. By way of another example, the memory 606 may be configured to record the communications channels on which network nodes 602 receive the initial link establishment message. By way of another example, the one or more processors 604 may be configured to record a quantity of relays required for a link establishment message to reach a responding node 106, 406 from the calling node 102. Further, the responding node 106, 406 may respond to the calling node 102, 402 with the information regarding the quantity of relays required to receive the link establishment message. It is noted herein that network node 602 may be incorporated into the calling nodes, one or more intermediate nodes, or the responding nodes of FIG. 2A-2C, 3A-3C, 4, or 5.

In some embodiments, the calling node 102, 402 may be configured to transmit the link establishment message continuously, in each subslot, or the calling node 102, 402 may be configured to interrupt its transmission to determine whether it hears other nodes repeating its message and which channels its message is being repeated on. It is noted herein that the information gathered above may be particularly useful before the node has established which channels it has direct connection to other nodes on.

In some embodiments, the one or more processors 604 may be configured to record a specific communication channel and hop in which the network node 602 first received the message. For example, the information gathered above may be utilized to optimize the channel selection. In some embodiments, the responding node 106, 406 may use diversity to combine the link establishment message from more than one channel. For example, if the responding node 106, 406 received the link establishment message on a single channel, then it could respond directly on that same channel. By way of another example, if the responding node 106, 406 receives the link establishment message on multiple channels, then the responding node 106, 406 may be configured to select the channel that has successfully communicated a greater quantity of initial transmissions.

In some embodiments, the responding node 106, 406 may be configured to identify one or more communication channels that are the most successful in communicating the link establishment message. For example, the responding node 106, 406 may be configured to transmit a signal to the calling node 102, 402 through the one or more intermediate nodes 104, 404 or by responding on the one or more identified communication channels. By way of another example, the plurality of network nodes may be configured to identify a communication preference based on an order of transmission.

It is noted herein that the plurality of network nodes may be configured to communicate via a communication channel having a highest success rate, unless that communication channel is experiencing disruption. When disruption is identified in the most successful communication channel, it may be desirable to spread transmissions across potential propagating communication channels. For example, the plurality of network nodes may be configured to use the same communication channel when experiencing successful exchanges across those channels, and use new communication channels when experiencing failed exchanges.

In general, FIG. 7 illustrates a method 700 for link establishment, in accordance with one or more embodiments of the present disclosure. It is noted herein that the steps of method 700 may be implemented all or in part by the system 100 illustrated in FIG. 2A-2C, 3A-3C, 4, or 5. It is further recognized, however, that the method 700 is not limited to the system 100 illustrated in FIG. 2A-2C, 3A-3C, 4, or 5 in that additional or alternative system-level embodiments may carry out all or part of the steps of method 700.

In a step 702, the calling node 102 may be configured to transmit a link establishment message addressed to the responding node 106.

In a step 704, the one or more intermediate nodes 104 may receive the link establishment message via the one or more receiving channels and the responding node 106 may receive the link establishment message via the one or more receiving channels.

In a step 706, all the nodes in possession of the link establishment message may retransmit the link establishment message in a coordinated transmission.

It is noted herein that steps 704 and 706 may be repeated a configurable number of times.

In a step 708, the responding node 106 may receive the link establishment message from the calling node 102 and the one or more intermediate nodes 104 via one or more receiving channels.

In a step 710, the responding node 106 may transmit a response message directed back to the calling node 102.

In a step 712, the one or more intermediate nodes 104 may receive the response message via the one or more receiving channels and the calling node 102 may receive the response message via the one or more receiving channels.

In a step 714, all the nodes in possession of the response message may retransmit the response message in a coordinated transmission.

It is noted herein that steps 712 and 714 may be repeated a configurable number of times.

In a step 716, the calling node 102 may receive the response message from the responding node 106 and the one or more intermediate nodes 104 via or more receiving channels.

In some embodiments, the response may be transmitted through the same one or more intermediate nodes 104 that were used to receive the message. Further, the response may be transmitted through the same one or more channels that were used to receive the message.

In a step 718, a traffic channel may be configured to exchange data based on at least one of the link establishment call and the response message.

It is noted herein the method 700 is not limited to the steps and/or sub-steps provided. The method 700 may include more or fewer steps and/or sub-steps. The method 700 may perform the steps and/or sub-steps simultaneously. The method 700 may perform the steps and/or sub-steps sequentially, including in the order provided or an order other than provided. Therefore, the above description should not be interpreted as a limitation on the scope of the present disclosure but merely an illustration.

It should be noted the methods described herein for modifying, delaying, otherwise adapting signals received and/or transmitted by the nodes may be performed by the components operating within the node including but not limited to the one or more controllers 600, memory 606, or the one or more processors 604.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected" or "coupled" to each other to achieve the desired functionality, and any two components capable of being so associated can also be viewed as being "couplable" to each other to achieve the desired functionality. Specific examples of couplable include but are not limited to physically interactable and/or physically interacting components and/or wirelessly interactable and/or wirelessly interacting components and/or logically interactable and/or logically interacting components.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Also, while various components may be depicted as being connected directly, direct connection is not a requirement. Components may be in data communication with intervening components that are not illustrated or described.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A link establishment system, comprising:
   a plurality of network nodes, comprising:
      a calling node configured to transmit a calling message, addressed to a responding node;
      the responding node configured to receive the calling message and transmit a response message, addressed to the calling node; and
      one or more intermediate nodes configured to receive at least one of the calling message or the response message,
   wherein each node of the plurality of network nodes comprises:
      at least one transducer; and
      one or more controllers communicatively coupled to the at least one transducer, the one or more controllers include one or more processors configured to execute a set of program instructions stored in a memory, the set of program instructions configured to cause the one or more processors to:
         determine one or more receiving channels and one or more transmitting channels from a list of one or more accessible channels;
         receive at least one of the calling message or the response message via the one or more receiving channels; and
         retransmit at least one of the calling message or the response message a configurable number of times via the one or more transmitting channels,
   wherein each node of the plurality of network nodes in possession of the calling message is configured to retransmit the calling message in coordination with the other nodes in possession of the calling message a configurable number of times,
   wherein each node of the plurality of network nodes in possession of the response message is configured to retransmit the response message in coordination with the other nodes in possession of the response message a configurable number of times.

2. The system of claim 1, wherein at least one of the calling message or the response message are configured to retransmit zero times.

3. The system of claim 1, wherein at least one of the calling message or the response message contains data specifying the number of times that at least one of the calling message or the response message is to be retransmitted.

4. The system of claim 1, wherein the one or more processors are further configured to record which of the one or more accessible channels were used to transmit at least one of the calling message or the response message.

5. The system of claim 4, wherein each node of the plurality of network nodes transmitting the response message is configured to use the same one or more accessible channels that were used to receive the calling message by the transmitting nodes.

6. The system of claim 1, wherein the one or more processors are further configured to determine the number of retransmissions needed to successfully receive the message by at least one of the calling node, the one or more intermediate nodes, or the responding node.

7. The system of claim 6, wherein the responding node is configured to communicate the number of retransmissions needed to successfully receive the calling message to at least one of the one or more intermediate nodes or the calling node.

8. The system of claim 6, wherein the calling node is configured to communicate the number of retransmissions needed to successfully receive the response message to at least one of the one or more intermediate nodes or the responding node.

9. The system of claim 1, wherein the system further comprises a traffic channel configured to exchange data based on at least one of the calling message or the response message.

10. The system of claim 9, wherein the traffic channel is configured as an avalanche relay in at least one of a direction from the calling node to the responding node or a direction from the responding node to the calling node, and a number of relays used is based on a number of transmissions needed to successfully receive at least one of the calling message or the response message by at least one of the calling node or the responding node.

11. The system of claim 1, wherein each node of the plurality of network nodes includes one or more staring receivers, wherein the one or more staring receivers are configured to stare at each channel on the list of one or more accessible channels simultaneously.

12. The system of claim 11, wherein the one or more intermediate nodes are configured such that different channels are used by the plurality of network nodes for the coordinated retransmission of at least one of the calling message or the response message and each retransmission of the calling message or the response message by the same node need not be on the same channel.

13. The system of claim 12, wherein the used channels are chosen in a pseudo random fashion by each node of the plurality of network nodes.

14. The system of claim 12, wherein the used channels are chosen based on previous receptions by each node of the plurality of network nodes.

15. The system of claim 11, wherein the responding node transmits on one or more channels chosen based on the number of retransmissions which have occurred prior to the responding node hearing the calling message on that channel.

16. The system of claim 1, wherein the one or more controllers include at least one scanning receiver configured to scan the list of accessible channels, wherein each node of the plurality of network nodes with the at least one scanning receiver stop their scan upon receipt of the calling message and wait for a configurable time sufficient to allow for the response message to be received and any retransmissions completed before continuing to scan the list of accessible channels.

17. The system of claim 1, wherein at least one of the calling message or the response message requires a further exchange of at least one of a subsequent calling message or a subsequent calling message and a subsequent response message to set up the link.

18. The system of claim 1, wherein at least two nodes of the plurality of network nodes are configured to allow operation on at least two different kinds of channels.

19. The system of claim 18, wherein the at least two different kinds of channels include frequencies chosen for long range operation and frequencies chosen for short range operation.

20. The system of claim 18, wherein the at least two different kinds of channels are configured for communication across at least one of acoustic or RF media.

21. The system of claim 1, wherein at least one node of the plurality of network nodes does not retransmit at every opportunity in order to monitor retransmissions.

22. A link establishment system, comprising:
a plurality of network nodes, comprising:
 a calling node configured to transmit a link establishment message, addressed to a group of at least one responding node; and
 at least one responding node from the group of at least one responding node configured to receive the link establishment message from at least one of the calling node, one or more intermediate nodes, or at least one different responding node from the group of at least one responding node,
wherein each node of the plurality of network nodes comprises:
 at least one transducer; and
 one or more controllers communicatively coupled to the at least one transducer, the one or more controllers include one or more processors configured to execute a set of program instructions stored in a memory, the set of program instructions configured to cause the one or more processors to:
  determine one or more receiving channels and one or more transmitting channels from a list of one or more accessible channels; and
  receive the link establishment message via the one or more receiving channels,
wherein each node of the plurality of network nodes in possession of the link establishment message is configured to retransmit the link establishment message in coordination with the other nodes in possession of the link establishment message a configurable number of times.

23. The system of claim 22, wherein the system further comprises a traffic channel configured to exchange data based on the link establishment message.

24. The system of claim 23, wherein the traffic channel is configured as an avalanche relay.

25. A link establishment method comprising:
transmitting a calling message by a calling node, addressed to a responding node, via one or more transmitting channels;
receiving the calling message by one or more intermediate nodes via one or more receiving channels;
coordinating a retransmission of the calling message between the calling node and all other nodes that have received the calling message;
receiving the link establishment message by the responding node via the one or more receiving channels;
transmitting a response message by the responding node, addressed to the calling node, via the one or more transmitting channels;
receiving the response message by the one or more intermediate nodes via the one or more receiving channels;
coordinating a retransmission of the response message between the responding node and all other nodes that have received the response message;
receiving the response message by the calling node, via the one or more receiving channels; and
configuring a traffic channel to exchange data based on at least one of the calling message or the response message.

* * * * *